US006468355B1

(12) United States Patent
Thompson et al.

(10) Patent No.: US 6,468,355 B1
(45) Date of Patent: Oct. 22, 2002

(54) MANUFACTURE OF BOILING-STABLE GRANULAR RESISTANT STARCH BY ACID HYDROLYSIS AND HYDROTHERMAL TREATMENT

(75) Inventors: Donald B. Thompson, State College, PA (US); Jorge Brumovsky, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/578,550

(22) Filed: May 25, 2000

Related U.S. Application Data (60) Provisional application No. 60/136,569, filed on May 28, 1999, and provisional application No. 60/170,781, filed on Dec. 15, 1999.

(51) Int. Cl.[7] .............................................. C08B 30/12
(52) U.S. Cl. ......................................... 127/71; 127/38
(58) Field of Search ..................................... 127/38, 71

(56) References Cited

U.S. PATENT DOCUMENTS

| | | | |
|---|---|---|---|
| 4,009,291 A | 2/1977 | Mitchell et al. | 426/548 |
| 4,115,146 A | 9/1978 | Saint-Lebe et al. | 127/38 |
| 5,281,276 A | 1/1994 | Chiu et al. | |
| 5,378,491 A | 1/1995 | Stanley et al. | 426/661 |
| 5,593,503 A * | 1/1997 | Shi et al. | 127/32 |
| 5,817,180 A | 10/1998 | Ferguson et al. | 127/32 |
| 5,849,090 A | 12/1998 | Haralampu et al. | |

OTHER PUBLICATIONS

Chiu, C.W., Henley, M. Altieri, P. (1994.) No month provided, Process for making amylase resistant starch from high–amylose starch.

Englyst, H.N., Kingman, S.M., Hudson, G.J., nd Cummings, J.H. (1992.) No month provided, Classification and measurement of nutritionally important starch fractions. Eur. J. Clin. Nutr. 46:S33–S50.

Haralampu, S.G. and Gross, A. (1998.) No month provided, Granular resistant starch and method of making.

Jacobs, H. and Delcour J.A. (1998.) No month provided, Hydrothermal modifications of granular starch, with retention of the granular structure: A Review. J. of Agric. Food Chem. 46(8):2895–2905.

Jane J.L. and Robyt, J.F. (1984.) No month provided, Structure studies of amylose–v complexes and retrograded amylose by action of a–amylases and a new method for preparing amylodextrins. Carbohydrate Research 132: 105–118.

Prosky, L., Asp, N.G., Furda, I., DeVries, J.W., Schweizer, T.F., and Harland, B.F. (1985.) No month provided, Determination of total dietary fiber in foods and food products: collaborative study. J. Assoc. Off. Anal. Chem. 68(4): 677–679.

Shi, Y.C. and Trzasko P.T. (1997.) No month provided, Process for producing amylase resistant granular starch.

Sievert, D. and Pomeranz. Y. (1989.) No month provided, Enzyme–resistant starch. I. Characterization and evaluation by enzymatic, thermoanalytical, and microscopic methods. Cereal Chem. 66(4) : 342–347.

Sievert, D. and Pomeranz. Y. (1990.) No month provided, Enzyme–resistant starch. II. Differential scanning calorimetry studies on heat–treated starches and enzyme–resistant residues. Cereal Chem. 67(3) : 217–221.

\* cited by examiner

*Primary Examiner*—David Brunsman
(74) *Attorney, Agent, or Firm*—McKee, Voorhees, Sease, P.L.C.

(57) ABSTRACT

The invention discloses a boiling-stable granular resistant starch product which may comprise over 60% resistant starch as determined by the TDF method. The starch is made by subjecting a starch source to acid hydrolysis, followed by a hydrothermal treatment which is preferably heat-moisture treatment. The boiling-stable granular resistant starch product may be used in fromulating low-fat, high-fiber food products, as a tabletting aid, and as an inhibitor of excessive ice crystal formation in frozen products.

15 Claims, 7 Drawing Sheets

MANUFACTURE OF BOILING-STABLE GRANULAR RESISTANT STARCH BY ACID HYDROLYSIS AND HYDROTHERMAL TREATMENT

CROSS-REFERENCE TO RELATED APPLICATIONS

This application is a continuation-in-part of provisional application U.S. Ser. No. 60/136,569 filed May 28, 1999 and U.S. Ser. No. 60/170,781 filed Dec. 15, 1999. The disclosures of these applications are herein incorporated by reference.

FIELD OF THE INVENTION

This invention relates generally to the field of starch production. More specifically, this invention relates to the manufacture of a boiling-stable granular resistant starch.

BACKGROUND OF THE INVENTION

Starch is composed of two polysaccharides, both of which are glucans, or polymers of glucose. One is amylose, a linear fraction with glucose units joined by a 1-4 glycosidic bond. The other is amylopectin, a branched component where each branch is relatively short and contains about 20–30 glucose units. Starches from different sources are characterized by different relative proportions of the amylose/amylopectin. Depending on the source of the starch, it will contain about 20–28% amylose.

Amylose consists of 250–300 D-glucose units linked by $\alpha$-1,4-glucosidic bonds. These bonds tend to twist the chain into a helix. In amylopectin, the majority of the units are similarly connected by $\alpha$-1,4-glucosidic bonds, with occasional $\alpha$-1,6-glucosidic bonds.

Before starches can be absorbed by the intestinal epithelium, they must be hydrolyzed to their constituent monosaccharide subunits. This cleavage occurs sequentially in different parts of the gastrointestinal tract. Enzymes are first secreted in the saliva (an $\alpha$-amylase [ptyalin]) and subsequently as another $\alpha$-amylase in the pancreatic juice. Digestion is continued and completed in the small intestine. Both salivary and pancreatic amylases are 1,4-glucosidases and serve to hydrolyze only the 1,4-glucosidic bonds found in starch and glycogen. Enzymes which attack 1,6-glucosidase linkages are associated with endothelial cells of the small intestine.

Until recently, starch was believed to be fully digested in the small intestine. It is now known that the physical state of ingested starch can result in incomplete digestion in the small intestine.

Undigested starch reaching the large intestine may be fermented to a variable extent. Fermentation products include volatile fatty acids (butyrate, propionate, acetate), which may be absorbed by the colonic epithelium and either metabolized or transferred to the liver through the portal vein. Non-fermented starch appears in the feces.

Resistant starch (RS) is resistant to digestion by $\alpha$-amylase, and has been defined as "the sum of starch and products of starch degradation not absorbed in the small intestine of healthy individuals." Even though RS escapes digestion in the small intestine, it may be fermented in the large intestine by colonic microflora. In the last decade, there has been an increased interest in the nutritional implications of RS, not only because of its decreased caloric content but also because RS may have a similar physiological effect as dietary fiber. Moreover, the fact that processing treatments may alter RS content in foods has gained the attention of food technologists.

RS has been classified in four different categories: (1) type I, resulting from physical inaccessibility in intact tissues or other large particulate materials; (2) type II, resulting from the physical structure of the uncooked, native starch granules, especially potato, banana, and high-amylose maize starch; (3) type III, resulting from the physical structure of associated starch molecules after the starch granules are cooked; and (4) type IV, resulting from chemical modification that interferes with the enzyme digestion.

Type I RS is easily understood and can be readily lost in processing treatments. Type IV RS results from covalent modification of the starch substrate such that the $\alpha$-amylase can not approach the susceptible glycosidic linkages. Based on the general inclination of food manufacturers to avoid "modified starch" on the label of the label of a formulated food, intentional generation of RS by chemical modification is not preferred.

Although the four types of RS would suggest four approaches to manufacture RS, only the approach for manufacturing type III RS has been extensively studied. (Pomeranz 1992; Gidley et al. 1995; Eerlingen and Delcour 1995). The approach for manufacturing type IV RS is somewhat limited by the type and extent of derivatization that may be legally used in foods. Little information about strategies to improve the manufacture of types I and II RS exists in the literature.

Some varieties of starches are good sources of type II RS (as determined by the procedure of Euglyst et at. 1992), for example, banana (69–89% RS), potato (80–87% RS), and high-amylose maize starches (HAMS)(55–85% RS). However, the enzyme resistance of these starches is highly reduced (HAMS) or completely lost (banana and potato) after moderate heat processing conditions, such as boiling in excess of water. The lack of thermal stability of type II RS represents a limitation for use of food ingredients with type II RS.

On the other hand, type III RS is considered to be thermally stable. The thermal stability of type III RS has made it a suitable additive for uses in many foods intended to contain RS. Several manufacturing processes have been developed to increase the yield of type III RS. In these processes, the preferred material has been high-amylose maize starch (HAMS). The most common commercially available types of HAMS are not gelatinized by boiling in excess water at atmospheric pressure. The HAMS's are autoclaved (at 121° C. or higher) for production of type III RS. Additional treatments, including limited acid or enzyme hydrolysis before or after autoclaving have been used to enhance the yield of RS. U.S. Pat. No. 5,281,276 (Chiu, et al). After gelatinization by autoclaving, however, the material is no longer in granule form.

Unlike the type II RS of potato or banana, the type II RS of some types of HAMS is not completely lost on boiling at 100° C. Many investigators have employed the AOAC method for Total Dietary Fiber (TDF) as a means of preparing RS for further analysis. [Sievert, D. et al. (1989). Enzyme-resistant starch. I. Characterization and evaluation by enzymatic, thermoanalytical, and microscopic methods. Cereal Chem. 66(4): 342–347]. This analytical procedure involves simultaneous boiling and thermostable $\alpha$-amylase digestion. Although this procedure was designed for TDF, a fraction of the RS will contribute to the putative TDF. For native HAMS as well as from various sources of type III RS, when the starch sample is subjected to the TDF analytical procedure, no other source of TDF is present at the start, and purified RS may be isolated. However, by this approach no RS can be isolated from potato or banana starch, because for these starches the granule structure and its constituent resistant elements are lost due to the boiling treatment (even for HAMS, much of the original type II RS is lost during this analysis). Thus, HAMS is unique in that it is a source of heat-resistant type II RS, which by definition is in granular form. A limitation of native HAMS is that the proportion of heat-resistant type II RS is relatively low.

The thermal stability of type II RS has been enhanced by hydrothermal treatments. Annealing and heat-moisture treatments have been considered two types of hydrothermal treatments that can modify the physicochemical properties of starch without destroying the granule structure. Both treatments involve incubation at certain moisture levels and temperatures above the glass transition temperature and below the gelatinization or melting temperature. Heat treatments at high-moisture levels have been termed "annealing" (ANN) while treatments performed at low-moisture levels have been termed "heat-moisture treatments" (HMT).

The structures responsible for type III RS formation are thought to be based on junction zones built up from associated double helices primarily from regions of amylose, but also possibly from the longer chains of the unique amylopectin of HAMS. The length of acid-resistant regions has been estimated as from 40–80 AGU. (Jane J. L. et al. (1984), Structure studies of amylose-v complexes and retrograded amylose by action of a-amylases and a new method for preparing amylodextrins. Carbohydrate Research 132:105–118.) The structures responsible for type II RS are not understood, but it is reasonable to suppose that the RS can also be accounted for at least partially by double helices that are associated with other double helices.

Acid hydrolysis after thermal processing has been used to increase the proportion of RS in the product by selectively removing non-RS material. (Chiu et al., U.S. Pat. No. 5,281,276.) Others have recently shown ANN followed by partial acid hydrolysis can result in an increased proportion (about 30%) of granular RS from HAMS. Haralampu et al., U.S. Pat. No. 5,849,090.

The present inventors have now surprisingly discovered that even higher yields of RS are possible when the sequence of ANN followed by acid hydrolysis is reversed, with acid hydrolysis followed by the hydrothermal treatment.

It is therefore an object of the present invention to provide a method and means of increasing the yield of thermally stable RS.

It is yet another object of this invention to provide a method and means of increasing the yield of thermally stable RS using a hydrothermal treatment.

It is yet another object of this invention to provide a method and means of increasing the yield of thermally stable RS in granule form.

It is yet another object of this invention to provide a method and means of increasing the yield of thermally stable RS which uses the acid-resistant portions of the starch granule as a template for enhancing enzyme resistance.

Other objects of the invention will become apparent from the description of the invention which follows.

SUMMARY OF THE INVENTION

The present invention describes the use of partial acid hydrolysis of granular starch followed by hydrothermal treatment to produce granular resistant starch (RS) that is stable to further heat treatment at atmospheric pressure. Partial acid hydrolysis causes partial depolymerization of the starch, making it more susceptible to hydrothermal treatment. The acid hydrolyzed starches are then treated by annealing or heat-moisture treatment that modify the physicochemical properties of the starch without destroying its granular structure. The resulting granular RS has an unexpectedly high yield of RS (greater than 60%) in comparison to RS produced by hydrothermal treatment followed by limited acid hydrolysis (about 30%).

DETAILED DESCRIPTION OF THE INVENTION

The present invention is based on an improved method of manufacturing type II RS that is stable to further heat treatments at atmospheric pressure. Specifically, the process combines acid hydrolysis of a granular starch, followed by a hydrothermal treatment, which may be annealing (ANN) or heat-moisture treatment (HMT).

Since starch molecules are much longer than the helical lengths thought to be responsible for enzyme resistance, their length represents a kinetic constraint to the mobility necessary to improve the stability of existing structures. Thus, the present invention provides the strategy of partially reducing the molecular weight of the starch molecules with partial acid hydrolysis or other means of starch hydrolysis in order to enhance the effects of hydrothermal treatments. Hence, the strategy embodied by this invention is one that uses the acid-resistant portions of the starch granule as a template for enhancing the enzyme resistance. This strategy is distinct from that of destroying the initially ordered regions to allow resistance based on newly formed ordered structures, the fundamental basis for methods of production of type III RS. (Englyst, H. N. et al. 1996. Measurement of resistant starch in vitro and in vivo. Br. J. Nutr. 75:749–755.)

As used herein, "annealing" (ANN) is defined as heat treatments at high-moisture levels of greater than 40% wet basis. This meaning of the term "annealing" is not shared by polymer scientists, who tend to consider annealing as a treatment just below the equilibrium melting temperature. Such a temperature is poorly defined for the heterogeneous (both intra- and inter-molecularly so) starch molecules.

As used herein, "heat-moisture treatments" (HMT) are defined as heat treatments at low-moisture levels of less than 35% wet basis.

As used herein, the term "granular starch" includes starch which predominantly retains its granular structure.

The strategy of this invention is applicable to any source of granular starch. Preferred starches are high amylose starches, most preferably starches containing at least 40% by weight amylose. While high amylose maize starch (HAMS or ae-VII) is especially suitable for use in this invention, other useful starch sources, high-amylose or otherwise, include but are not limited to corn, potato, sweet potato, wheat, rice, barley, tapioca, cassava, arrow-root, sago, oat, and sorghum.

The starch source of this invention may be unmodified or modified. Chemically modified starches include the conversion products derived from any of the former bases, for example, starch prepared by hydrolytic actions of enzymes, acid and/or heat, oxidized starches prepared by treatment with oxidants such as sodium hypochlorite, fluidity or thin boiling starches prepared by enzyme conversion or mild acid hydrolysis, and derivatized and crosslinked starches. The starch source is preferably unmodified.

As already described above, for some time it has been known that the physical state of starch can be altered, without loss of granular structure, by a variety of combinations of heat and moisture. With sufficient moisture ($\geq 40\%$ by weight water), temperatures must be held below the normal gelatinization temperature. At lower moisture levels (<35% by weight water), gelatinization occurs at higher-than-normal temperatures, and so higher temperatures can be employed without loss of granule structure.

In accordance with the methods of this invention, the granular native starch is first combined with an aqueous medium, such as water or a buffer to form a suspension containing from about 1% to 40% w/v starch, with about 35% w/v being preferred. The starch is then partially hydrolyzed by use of an amyloloytic enzyme, such as α-amylase or glucoamylase, or an appropriate acid, such as a mineral acid or organic acid. Preferred acids for this purpose include sulfuric acid, nitric acid, and hydrochloric acid, with concentrated HCl being most preferred, and about 1% HCl (on a starch basis) is especially preferred.

Generally, the starch should be incubated with the acid or enzyme for a time period sufficient to at least partially, but not completely, depolymerize the starch molecule. The depolymerized starch molecule will result in a chromatogram resembling those shown in FIGS. 7A–7D. This time period generally ranges from about 1–100 hours, with between about 6–78 hours being preferred, and about 30–78 hours being most preferred. The conditions for acid hydrolysis should be such that inappropriate side reactions are minimized and the starch granules remain intact. Acid hydrolysis should take place at a temperature of between about 20–50° C. Following hydrolysis, the partially hydrolyzed starch is preferably neutralized with a base, such as NaOH, to a pH of around 6.5–7.5.

After the starch is partially hydrolyzed, it is subjected to one of two types of hydrothermal treatments, namely ANN or a HMT, in order to enhance the inherent metastability of the granules. ANN generally involves incubating hydrolyzed starch suspensions at high-moisture levels (at least 40% weight basis) and an annealing temperature ranging between about 40–70° C. The starch suspension is incubated for about 2 to 48 hours, with about 6–24 hours being preferred.

The preferred annealing conditions will vary depending on the starch used, its amylose content, the level of total dietary fiber content desired, as well as the amount of moisture and the heating temperature. For HAMS, the preferred moisture level is about 40%, and the most preferred moisture level is about 70%, with about 24 hours being the preferred incubation time. For HAMS, the preferred annealing temperature is about 70° C.

Due to improved RS yield, HMT is the preferred hydrothermal treatment. For HMT, the starch is heated at a temperature of between about 90–150° C. at low-moisture levels of <35% (wet basis) for a time period ranging from about 20–120 minutes. The preferred moisture level is 20–35%, with a most preferred moisture level of about 30%. The preferred HMT temperature for HAMS is about 120° C. and the preferred incubation time is between 60–100 minutes. Again, the preferred HMT conditions will vary depending on the starch used and its amylose content.

The resulting starch granules have an RS yield that is substantially higher than starch granules that are not treated with partial acid hydrolysis followed by hydrothermal treatment. In fact, starch granules that are partially acid hydrolyzed followed by HMT have an unexpectedly high yield of greater than 60% RS (by the TDF method), in comparison to conventional RS starch compositions which typically only have about a 30% RS yield. In general, the starch shows a significant decrease in gelatinization enthalpy during heating and reheating relative to the original starch. Further, the granular structure of the starch remains intact.

The RS starch granules of this invention can be used in suspended form or can be dried to a powder by a number of art-recognized methods, including air-drying, spray-drying, belt drying, freeze drying, drum drying, or flash drying. The powder can be stored at room temperature and redispersed in water or other aqueous medium which is compatible and safe for use in food and beverage formulations.

The RS starch produced in accordance with this invention can be used as a dietary fiber supplement, as a replacement or substitute for sugar and flour in a variety of baked goods, as a fat extender in reduced fat, low-fat, and fat free formulations, as a tableting aid, and as an inhibitor of excessive ice crystal formation in frozen products.

The RS starch of this invention is particularly useful in formulating foods and beverages containing reduced amounts of sugar, flour or fat. Generally, the granular resistant starch may be used in food formulations in amounts ranging from about 0.1% to about 50% by weight, with the amount depending on the product. Foods formulated with the RS starch of this invention in place of sugar, flour, and/or fat have a lower caloric content (>50% reduction when RS product substitutes for sugar), higher fiber content, and/or lower fat content. Typical food products to which the RS starch product of this invention may be added include cereals, breads, crackers, cookies, cakes, muffins, rolls, pastries, pasta, beverages, etc.

The following examples are offered to illustrate but not limit the invention. Thus, they are presented with the understanding that various formulation modifications as well as method of delivery modifications may be made and still be within the spirit of the invention.

EXAMPLE 1

Preparation of RS Starch

Materials

The following starch samples were obtained: a commercial maize starch reported to contain 70% amylose (hereafter referred to as ae-VII, Hylon VII, National Starch and Chemical Co), a commercial corn starch (common corn starch, hereafter referred to as CCS, Melojel, National Starch and Chemical Co, Bridgewater, N.J.), potato starch (cat. no. 4251, Sigma, St. Louis, Mo.), and wheat starch (cat. no. 5127, Sigma Co). All reagents were ACS grade or better.

Amyloglucosidase solution (AMG) (AMG 300 L, activity 300 AGU/ml) and heat-stable α-amylase (Termamyl 120 L, activity 120 KNU/ml) were obtained from Novo Nordisk BioChem North America, Inc., (Franklinton, N.C.). Pancreatin (cat. No. 7545, activity 8×USP/g) was obtained from Sigma. Invertase solution (cat. No. 390203D, 3000 EU/ml) was obtained from BDH, Inc. (Carle Place, N.Y.). A total dietary fiber assay kit (cat. No. K-TDFR) was obtained from Megazyme International Ireland Limited (Co. Wicklow, Ireland). The kit contained thermostable α-amylase (Megazyme E-BLAAM) and amyloglucosidase (Megazyme E-AMGDF). A glucose oxidase/peroxidase assay kit (cat.

no. K-GLUC) was also obtained from Megazyme International Ireland Limited.

A glucose standard solution was prepared by weighing 20 g glucose, 0.4 g benzoic acid, and 13.61 g sodium acetate trihydrate, and making up to 200 ml with deionized water.

For the method of Englyst et al (1992) an enzyme solution was prepared as follows. 18 g pancreatin was weighed in a beaker. 180-ml water was added and stirred by magnetic stirrer for 10 min. Half of the final volume was taken into each of two 225 ml centrifuge tubes and centrifuged at 1500 g for 10 min. 45 ml of the cloudy supernatant was removed from each tube and transferred to a brown glass volumetric flask (90 ml total) containing 5.3 ml amyloglucosidase solution, 6 ml of invertase solution, and made up to 200 ml with deionized water.

Methods

Partial Acid Hydrolysis

A 35% w/v suspension of Hylon VII starch in water was prepared in a flask. While stirring, concentrated HCl was added to the flask to result in 1% HCl (w/w, HCl/dry starch). The flask was stoppered and put into an incubation chamber at 25° C. Equal fractions of the suspension were removed at 6, 30, and 78 hours of incubation. The fractions were immediately neutralized to pH 7 with a 3% w/v solution of NaOH, and vacuum filtered. The samples were then suspended in deionized water and filtered again. The latter procedure was repeated three times, and a final wash was made with 95% ethanol. The samples were dried in a convection oven at 40° C. and then were ground using a mortar and pestle. The ground samples were screened through a 120-mesh sieve (125 μm opening).

Native and partially hydrolyzed ae-VII starches were dispersed in 90% DMSO, dried, and examed by size exclusion chromatography (SEC) on Sepharose CL-2B (Klucinec and Thompson 1998). SEC fractions were analyzed for total carbohydrate using the phenol-sulfuric acid assay (Dubois et al. 1956).

Annealing

Native starch and hydrolyzed ae-VII starches were annealed by incubating 30% starch suspensions for 24 hours at 50° C., 60° C., or 70° C. The annealed samples were filtered and then washed with water and ethanol. The samples were then dried in a convection oven at 40° C., ground, and screened through a 120-mesh sieve (125 μm opening).

Heat-moisture Treatments of Starch Samples

Native starch and partially hydrolyzed ae-VII starches were heat-moisture treated by heating samples in a 25 ml stainless steel bomb placed in a thermostatically controlled convection oven (±1° C.). Samples at 70% starch solids were heated at 100° C., 120° C., or 140° C. for 80 min. After the treatments, the samples were cooled in a water-ice bath for ~5 min. The samples were then dried in a convection oven at 40° C., ground, and screened through a 120-mesh sieve (125 μm opening).

Experimental Design and Statistical Analysis

Two full factorial designs with two-factors at four levels were used. The first design studied the hydrolysis time and annealing temperature. The levels were no hydrolysis, or 6, 30, or 78 hours for the hydrolysis time and either no ANN, or 50, 60, or 70° C. for the annealing temperature. The second design studied the hydrolysis time and heat-moisture treatment temperature. The levels for the second design were no hydrolysis, or 6, 30 or 78 hours for the hydrolysis time and either no HMT, or 100, 120, or 140° C. for the HMT temperature. Experimental data were analyzed based on a full model. Calculations were performed using the General Linear Model Procedure provided by the software package Minitab v. 12.23. All pairwise comparisons were determined by Tukey's test at a family error rate of α=0.05.

DSC Thermal Analysis

Thermal analysis was performed using a differential scanning calorimeter (DSC 7, Perkin-Elmer Corp., Norwalk, Conn.) equipped with a thermal analysis data station (Perkin-Elmer). Indium was used as a calibration standard. The reference cell contained a sealed, empty, stainless steel pan. Starch samples (~15.0 mg, dwb) were weighed into preweighed stainless steel pans (Perkin-Elmer). Deionized water was added to make ~30% (w/w) starch suspensions. The samples were stirred with a needle. The pans were sealed, the total weights were determined, and the suspensions were stored overnight at room temperature. Samples were heated from 20° C. to 80° C. at a heating rate of 10° C./min. Samples were then quench cooled from 180° C. to 120° C. and were immediately reheated to 180° C. at 10° C./min. Gelatinization enthalpy and onset temperatures were calculated for each thermal event using thermal analysis software (7 Series Software, Perkin-Elmer). Thermal analyses were performed at least in duplicate.

RS Determination

The method used here was modified from that of Englyst et al. (1992) for analysis of essentially protein-free starch samples. By this procedure RS is defined as the starch not hydrolyzed after incubation with pancreatic amylase and amyloglucosidase at 37° C. after 120 min. RS was expressed as the percentage of total dry starch:

$$RS\ \% = \frac{TX - DS}{TS} \times 100$$

TS=Mass of total starch (g)
DS=Mass of digested starch (g)

Determination of Digested Starch

~0.5 g starch samples were weighed into 50 ml polypropylene centrifuge tubes. 5 ml sodium acetate solution (0.5 mol/l) and 10 ml guar gum solution (5 g/l, in HCl 0.05 mol/l) were added to the sample tubes and the blank tube. 5 ml of glucose standard solution and 10 ml of guar gum solution (5 g/l, in HCl 0.05 mol/l) were added to the standard tube. 5 glass balls (~1.5 mm diameter) were added to each tube and the contents mixed using a vortex-mixer. The tubes were completely immersed in a shaking water-bath at 37° C. to equilibrate for ~5 min. Samples were removed from the water-bath and 10 ml of the prepared enzyme solution (see above) were added to each tube. The tubes were immediately returned to the water-bath and the shaking action was initiated. The water-bath was adjusted to a stroke speed of ~150 strokes/min and a stroke length of 35 mm to ensure mixing action of the glass balls. After 120 min, the shaking action of the water-bath was interrupted and 50 μl were removed from each tube and transferred to 2 ml microcentrifuge tubes (MCTs) containing 1 ml absolute ethanol. The material in the 50 ml centrifuge tubes was analyzed for total starch (see below). The MCTs containing the samples were mixed using a vortex-mixer and analyzed for glucose by the glucose oxidase/peroxidase assay.

Glucose Oxidase/Peroxidase Assay

Samples were centrifuged for 5 min at 1500 g. 100 μl of supernatants was added to a MCT containing 1.5 ml glucose oxidase/peroxidase reagent. MCTs were incubated in a water-bath at 45° C. for 20 min. The sample contents were transferred to spectrophotometer cuvets. Absorbances of samples and standard were read against a reagent blank.

Determination of Total Starch

After the removal of 50 μl at 120 min, the remaining contents of the 50 ml sample tubes were placed in a boiling water-bath for 30 min. After vortex-mixing, the sample tubes were cooled in an ice-water-bath for 15 min. 10 ml KOH solution (7 mol/l) was added, and the mixture was vortex-mixed again. The tubes were returned to the icewater-bath and shaken for 30 min. Tubes were removed from the ice-water-bath, and 200 μl of the contents were added to 2 ml MCTs containing 1 ml of 1 mol/l acetic acid. 40 μl AMG solution (diluted 1:5.25 with water from the original AMG solution) was added to the MCTs and vortex-mixed. The MCTs were placed in a 70° C. water-bath for 30 min followed by 10 min in a boiling water bath. 100 μl of the MCT contents were added to 2 ml MCTs containing 1 ml absolute ethanol, vortex-mixed, and analyzed for glucose by the glucose oxidase/peroxidase assay.

Determination of Boiling-Stable RS by the TDF Method

The method used for determining the portion of RS stable to boiling followed the pattern of the AOAC. method for determination of total dietary fiber. The method was adapted for basically protein-free starch analysis. 0.5 g samples were suspended in 20 ml of MES/TRIS buffer (pH=8.2) and incubated with 25 μl thermostable α-amylase (Megazyme E-BLAAM) at 95–100° C. for 35 min. The samples were then cooled at 60° C. and pH adjusted to 4.1–4.8 with 5% NaOH or 5% HC1. The samples were next incubated with 100 μl amyloglucosidase (Megazyme E-AMGDF) at 60° C. for 30 min. The mixtures were vacuum filtered and washed with 10 ml deionized water, 95% ethanol, and acetone. The boiling-stable portion of RS was determined as the residue remaining after drying the samples in a convection oven at 103° C. overnight.

Determination of Boiling-Stable RS by the Englyst Method

Prior to RS analysis as determined by Englyst et al. (1992)(see above), starch samples in a 50 ml PCT were placed in a boiling water bath for 35 minutes, and then immediately cooled in a water-ice bath for 5 minutes.

Time Course of the Starch Digestion

The digestion of ae-VII starch, partially acid-hydrolyzed and annealed ae-VII starches, and partially acid-hydrolyzed and heat-moisture treated ae-VII were followed at intervals through 4 hours. The extent of the digestion was determined by the method of Englyst et al (1992). Samples were either boiled 35 min or not prior to the digestion.

The digestion of corn, wheat, and potato starches, with or without a 35 min boiling treatment, was monitored as well.

Results

DSC Thermal Analysis

Figure 1:
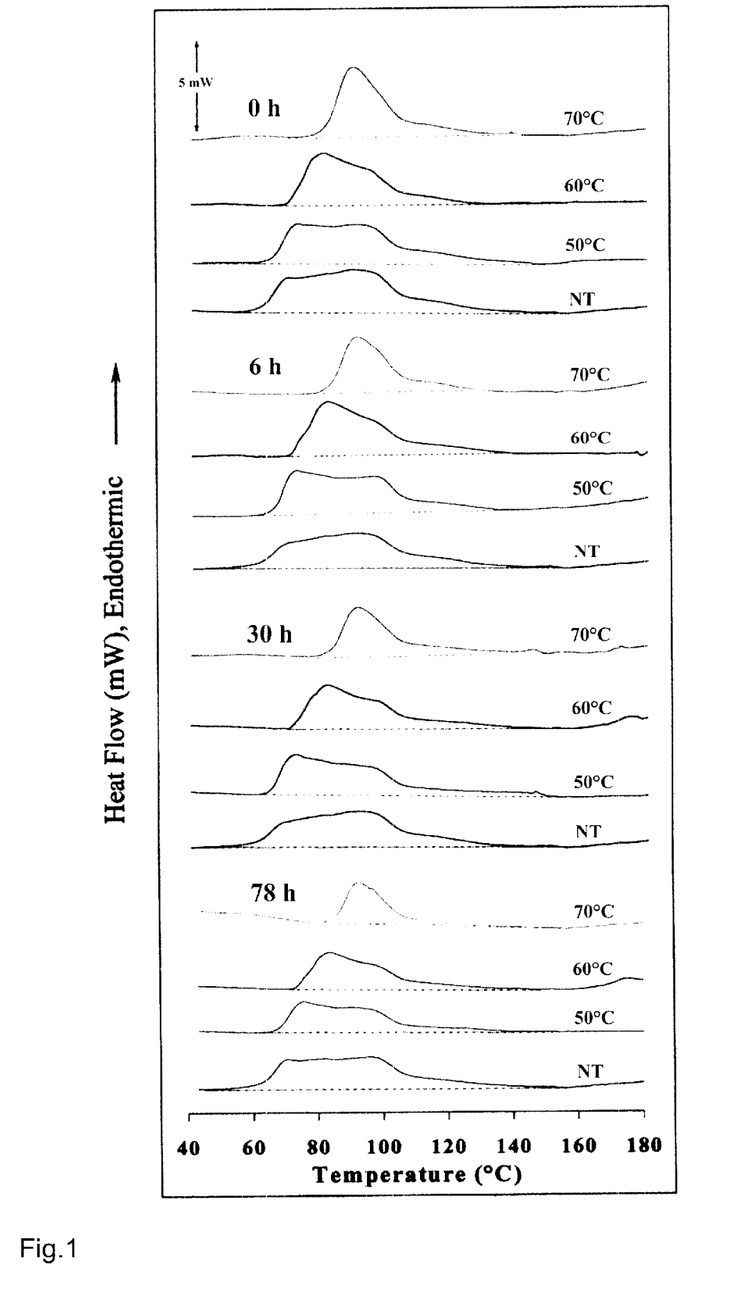
FIG. 1 shows DSC thermograms for initial heating of native ae-VII starch, partially acid hydrolyzed ae-VII starches, and partially acid hydrolyzed and annealed ae-VII starches. NT=no annealing treatment.
Figure 2:
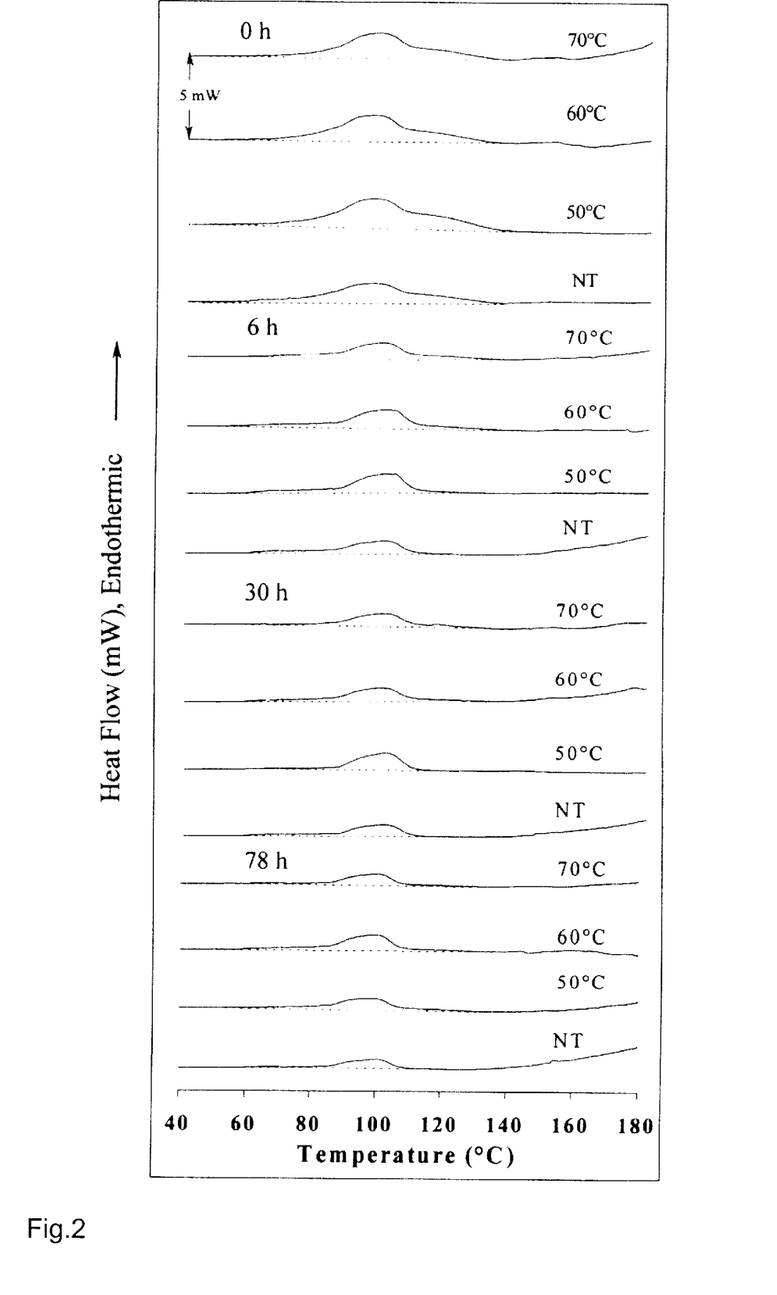
FIG. 2 shows DSC thermograms for immediate reheating of native ae-VII starch, partially acid hydrolyzed ae-VII starches, and partially acid hydrolyzed and annealed ae-VII starches. NT=no annealing treatment.

Native ae-VII Starch ae-VII starch showed a typical broad endotherm characteristic of high-amylose maize starches during initial heating (FIG. 1). This broad thermogram has been interpreted as resulting primarily from two overlapping endothermic phase transitions. The enthalpy of the lower portion of the temperature range represents an irreversible transition associated with amylopectin gelatinization. This transition is not observed after cooling and reheating. Most of the enthalpy of the higher portion of the temperature range represents a reversible transition associated with melting of amylose-lipid complexes. The transition is also observed after cooling and reheating (FIG. 2), and is not observed in lipid-free starches. A portion of the endotherm is observed at a temperature higher than 120° C. (FIG. 1), and it is not observed on reheating (FIG. 2). This portion may be related to melting of amylose.

Partial Acid Hydrolysis

Partial acid hydrolysis (PAH) of ae-VII starch for up to 30 hours did not produce changes in the DSC. endotherms (FIG. 1). After 78 hours of acid hydrolysis, the low-temperature region appeared to be somewhat more pronounced. No effect of hydrolysis treatment was found on the onset temperatures and the transition enthalpies (Table I). However, hydrolysis treatments significantly decreased the enthalpy associated with the amylose-lipid complexes as observed during immediate reheating (Table I).

The hydrolysis treatments led to decreased transition enthalpies observed in the immediate rescans (Table I). These transition enthalpies were lower at least partially due to a loss of peak area above 105° C. (FIG. 2).

Annealing

ANN treatments of ae-VII starch without PAH influenced the shape of the endotherms that occurred during heating (FIG. 1). With increasing annealing temperature, sharper and narrower transition peaks were observed (FIG. 1). The transition enthalpies of the annealed starches were not different from the transition enthalpy of the non-annealed starch (Table I). In the absence of PAH treatments, ANN of αe-VII starch did not significantly affect the shape nor the transition enthalpies of the endotherms ascribed to amylose lipid complexes as observed on reheating, as shown in FIG. 2 and Table I.

Partial Acid Hydrolysis Followed by Annealing

PAH followed by ANN of ae-VII starch affected the onset temperature and the transition enthalpy of ae-VII starch not only during heating but also during reheating (Table I). When the treatments combining PAH and ANN are compared at the same level of ANN, it is apparent that longer hydrolysis times reduced transition enthalpies during heating and on reheating (Table I). In addition, a significant (α<0.001) interaction between hydrolysis time and annealing temperature was observed.

Heat-Moisture Treatment

Figure 3:
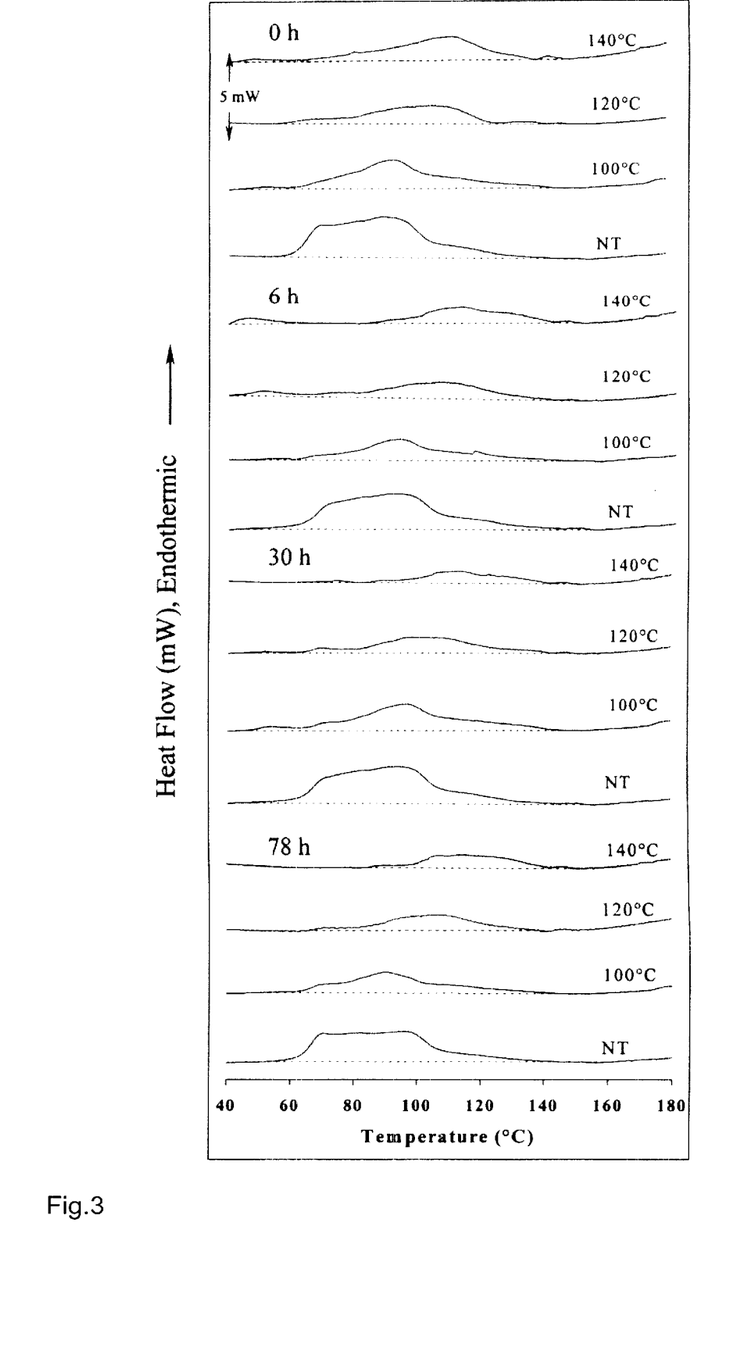
FIG. 3 shows DSC thermograms for initial heating of native ae-VII starch, partially acid hydrolyzed ae-VII starches, and partially acid hydrolyzed and annealed ae-VII starches. NT=no heat-moisture treatment.
Figure 4:
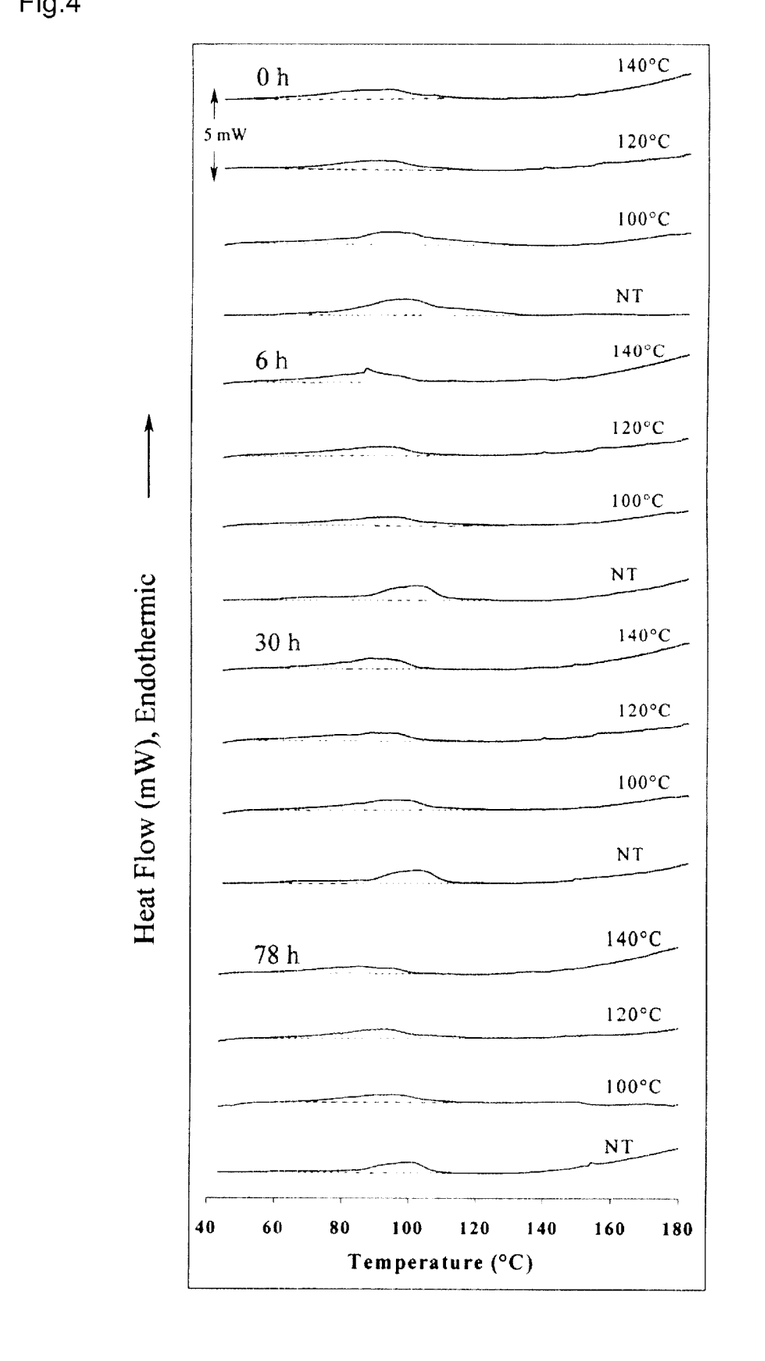
FIG. 4 shows DSC thermograms for immediate reheating of native ae-VII starch, partially acid hydrolyzed ae-VII starches, and partially acid hydrolyzed and heat-moisture treated ae-VII starches. NT=no heat-moisture treatment.

HMT of ae-VII starch without hydrolysis influenced the shape of the endotherm obtained during heating. Broader and more symmetrical endotherms extending to higher temperatures were observed for heat-moisture treated samples. As the HMT temperature increased, the peaks and the onset temperatures shifted to higher temperatures (FIG. 3). The gelatinization enthalpies of heat-moisture treated ae-VII starches were similar to the untreated starch (Table II). During reheating, the endotherms of all HMT samples were broader and their transition enthalpies were lower than the transition enthalpy of the respective non-heat-moisture treated starch (FIG. 4 and Table II).

Partial Acid Hydrolysis Followed by Heat-Moisture Treatment

The endotherms of the PAH and HMT samples presented a similar shape and temperature range as the endotherms of HMT samples alone. In contrast to the almost unchanged enthalpies obtained for the three HMT samples without PAH, the combination of hydrolysis and HMT led to a significant decrease in the gelatinization enthalpies relative to the samples with the same PAH treatment but without a HMT. In general, for combinations of PAH and HMT, higher HMT temperatures resulted in lower gelatinization enthalpies (Table II). Combination of PAH and HMT reduced the enthalpy of melting of amylose-lipid complexes (Table II). A significant (α<0.001) interaction between hydrolysis time and HMT was observed.

Resistant Starch Analysis

Native ae-VII Starch

Table III shows the RS content of ae-VII starch obtained by the TDF method and by the Englyst method. For native αe-VII starch, the TDF method determined far less RS (~18.4%) that what was determined by the Englyst method (~78.7%).

Partial Acid Hydrolysis

PAH treatments alone did not influence RS content of αe-VII starch as detected by the TDF method nor by the Englyst method (Table III).

Annealing

As determined by the TDF method, for the annealing treatment alone, only the 70° C. treatment altered the RS content of αe-VII starch, increasing it to a value of ~28% (Table III). In contrast, as determined by the Englyst method, the 50° C. annealing treatment led to a significant decrease in RS content, and even greater decreases in RS were observed for the 60 and 70° C. annealing treatments, respectively.

Partial Acid Hydrolysis Followed by Annealing

As determined by the TDF method, PAH before 60° C. ANN treatment of ae-VII starch yielded more RS than for ANN treatment. As determined by the Englyst method, PAH before ANN at 70° C. of ae-VII starch yielded less RS than for ANN treatments alone (Table III).

Heat-Moisture Treatment

As detected by the TDF method, HMT ae-VII starches increased in RS content (up to 52%) to a greater extent than for ANN (Tables III and IV). However, as determined by the Englyst method, all HMT samples had a lower RS content (~55%), similar to that for ANN (~53%) treatments, (Table III and IV).

Partial Acid Hydrolysis Followed by Heat-Moisture Treatment

By the TDF method, certain combinations of HMT and PAH produced higher RS values (for several combinations, RS was ~60%) than for PAH alone or for HMT alone (Table IV). As determined by the Englyst method, HMT after PAH of ae-VII starch tended to yield more RS than HMT alone (Table IV).

Stability of Type II RS to Boiling

RS from Potato, Wheat, and Corn Starches

Figure 5:
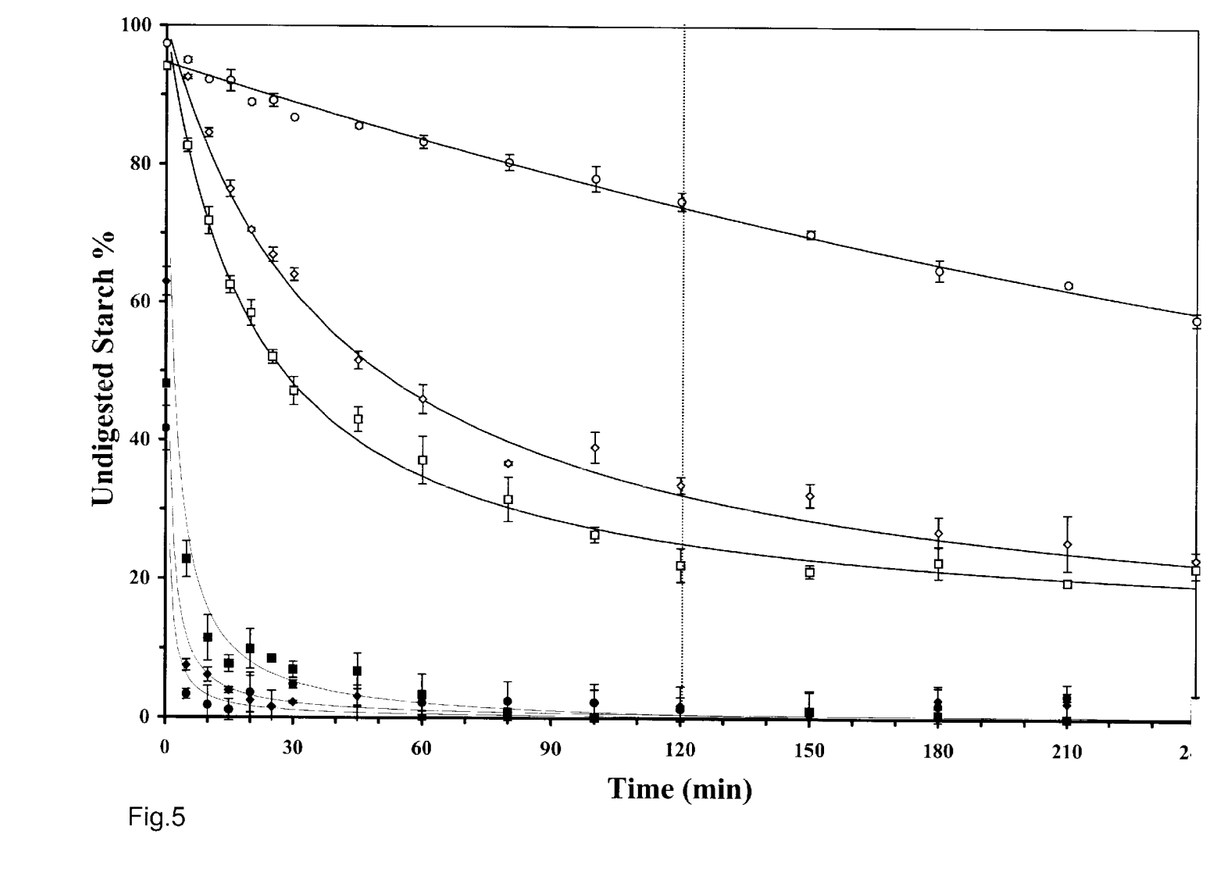
FIG. 5 shows starch digestion of corn (black diamonds), wheat (open squares), and potato starch (open circles) determined by the Englyst method before and after a boiling step.

FIG. 5 shows the time course of starch digestion of corn, wheat and potato starch by the method of Englyst et al (1992), before and after 35 min of boiling in excess of water. The data are expressed as the percentage of undigested starch over time.

The linear relation between the percentage of undigested potato starch was in agreement with the results of Englyst et al (1992) (FIG. 5). Furthermore, complete digestion of boiled potato starch after 1 hour of enzymatic hydrolysis was confirmed (FIG. 5).

Although boiled wheat and corn starches were rapidly digested well before 2 hours of enzymatic hydrolysis, a considerable amount of undigested wheat and corn starches remained after 2 hours of enzymatic hydrolysis (~25% and 35%, respectively).

Effect of Boiling Prior to Analysis by the Englyst Method

Figure 6:
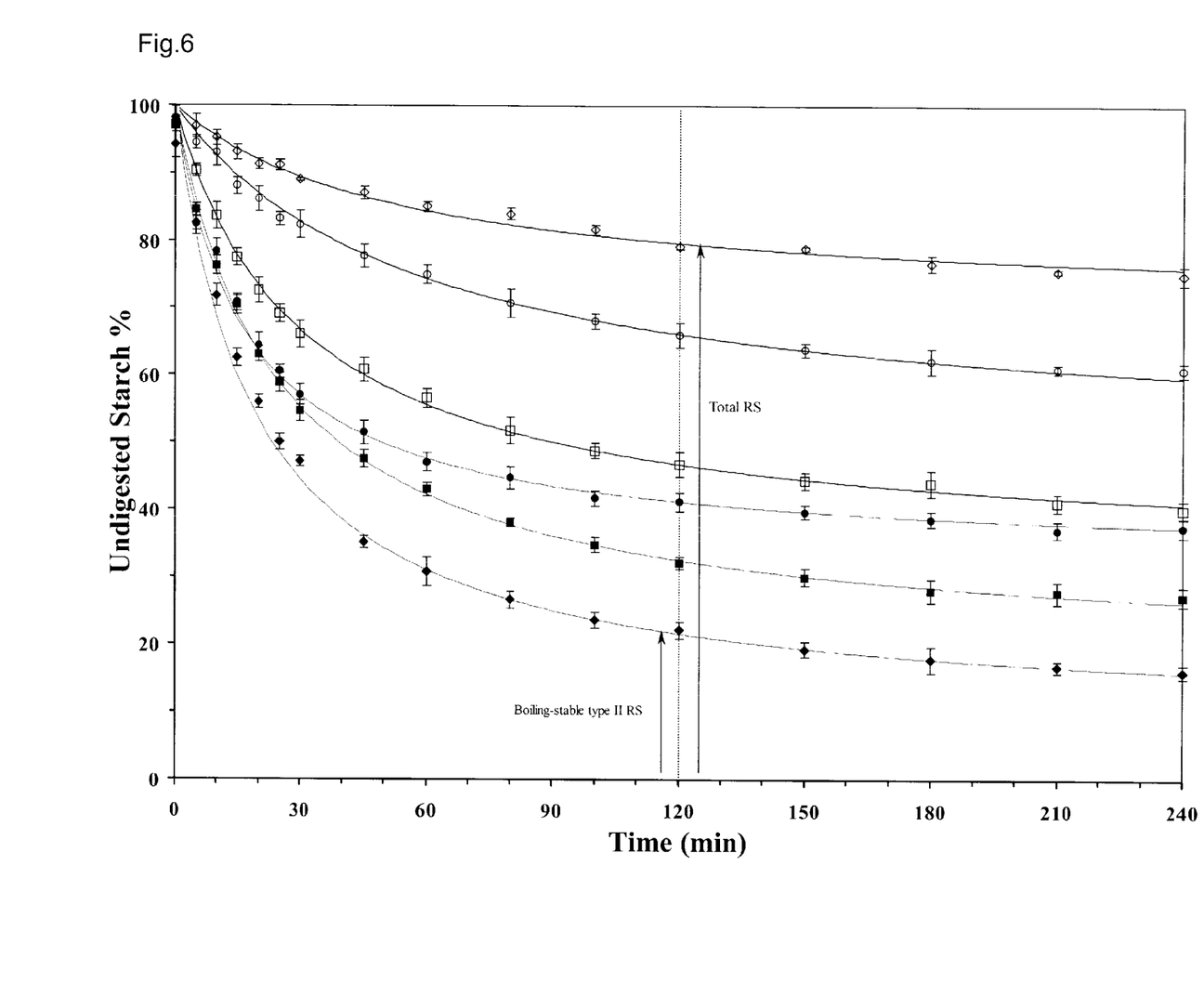
FIG. 6 shows starch digestion of ae-VII starch (black diamonds), ae-VII starch hydrolyzed 6 h and annealed at 70° C. (open squares), and ae-VII starch hydrolyzed 30 h and heat-moisture treated at 120° C. (open circles) determined by the method of Englyst et al. (1992) before and after a boiling step.
Figure 7A:
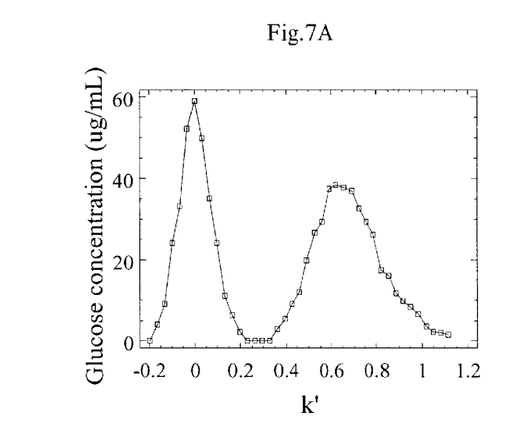
FIGS. 7A–7D show Sepharose CL-2B chromatograms of dispersed and dried native and hydrolyzed ae-VII starch.
Figure 7B:
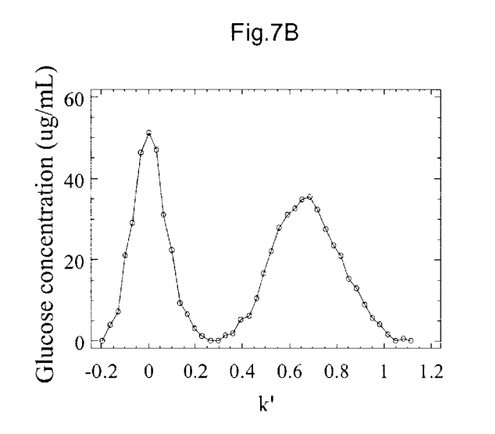
Figure 7C:
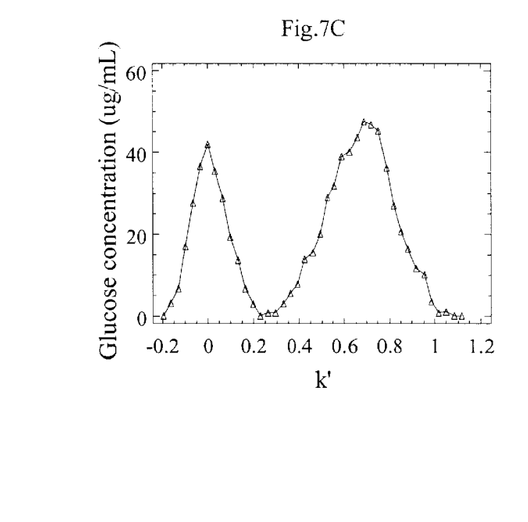
Figure 7D:
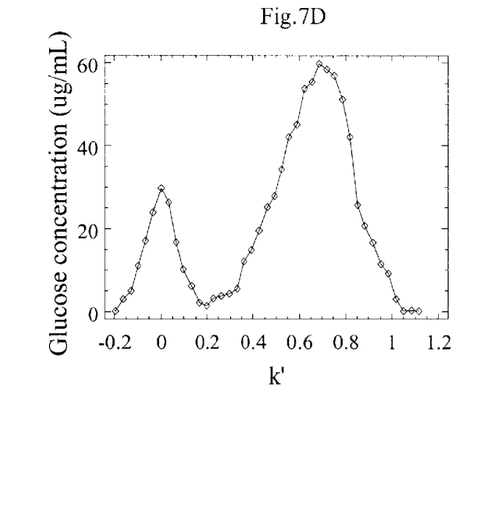

As determined by the Englyst method, boiling of ae-VII starch before analysis reduced the RS content from 78.7% to 20% (FIG. 6). Although ANN after PAH reduced the RS content of ae-VII starch as observed without boiling, this combination increased the boiling-stable RS content. HMT after PAH also reduced the RS content of ae-VII starch as observed without boiling, and it increased even more the boiling-stable RS content (FIG. 6).

Discussion

DSC Thermal Analysis

PAH of ae-VII starch without a subsequent hydrothermal treatment did not show an important effect on the gelatinization enthalpies (Table I). Mild acid hydrolysis treatments are known to preferentially attack the less organized regions of the granule. The objective of the mild hydrolysis was to decrease the average MW of the starch and enhance the effect of a subsequent hydrothermal treatment, through increased molecular mobility.

Klucinec and Thompson (1998) suggested that enthalpy observed above 105° C. on an immediate rescan could be due to longer amylopectin chain of ae-VII or to interaction between longer-chain amylopectin and amylose. The hydrolysis treatments appear to preclude these interactions, which otherwise occur on quench cooling after the initial heating in the DSC. Hydrolysis likely occurred between ordered regions in such a way as to retain the ordered structure but to preclude reformation of that structure after heating to 180° C.

ANN with or without PAH led to sharper and narrower peaks with increasing ANN temperature (FIG. 1 and Table I). Although the combination of PAH and ANN led to decreased gelatinization enthalpy, ANN treatment without PAH could be considered true annealing, as no partial gelatinization occurred. The decreased enthalpy observed for samples with ANN after PAH suggests that PAH may make the ae-VII starch granules more susceptible to gelatinization.

HMT with or without PAH led to considerable loss of enthalpy for the low-temperature region and enhanced enthalpy above 100° C., resulting in lower and broader endotherms. Although HMT alone had little effect on the gelatinization enthalpy, the combination of PAH and HMT led to a decrease in the gelatinization enthalpy. For combination treatments, the effect of HMT temperature was apparently more important that the time of PAH (Table 3). Combination treatments also led to the greatest decreases in the enthalpy observed on immediate reheating. The loss of some gelatinization enthalpy reveals that some melting had occurred during the heat-moisture treatment.

Several authors have subjected high-amylose maize starch to treatments above the gelatinization temperature in excess of water to enhance formation of RS. These authors related the formation of type III RS, as determined by the AOAC method of TDF, to the high-temperature endotherm (~150° C.) observed.

The thermal characteristics of retrograded αe-VII starch isolated by the AOAC. method for TDF (ref), and the thermal characteristics of annealed and heat-moisture treated αe-VII starches of this invention, were fundamentally different. To the extent that these thermal characteristics are both in some way related to enzyme resistance, the nature of enzyme resistant structures in the two cases would likely be different as well.

Starch Digestion

The digestion of raw potato starch was followed over time using the digestion procedure of the Englyst method for RS determination. Both raw and boiled raw potato starches were used, as positive and negative controls. The high percentage of undigested raw potato starch and the complete digestion of boiled potato starch after 120 min of α-amylase hydrolysis agreed with the results obtained by Englyst et al (1992) (FIG. 5), confirming that the method was correctly employed. Just as for the boiled potato starch, boiled corn and wheat starches were completely digested after 2 hours of amylolysis. However, the native corn and wheat starches remained 30 to 40% undigested (FIG. 5), indicating a significant amount of type II RS in these starches. Although the literature abounds with description of raw potato or banana starches as good sources of type II RS, there is little information in the literature addressing the question of type II RS of corn and wheat. It could appear that while raw corn and raw wheat starches are better digested than raw potato starch, they both contain important amounts of type II RS. It is clear that boiling eliminates the type II RS for potato, wheat, or corn starch.

Resistant Starch Analysis

The physiological definition of RS requires that any in vitro analytical procedure be validated in humans. Several analytical procedures for RS determination have been developed. In all of the methods, the nature of RS isolated in vitro has been found to be different from the composition of RS isolated in vivo, even though the amounts of isolated resistant material may quantitatively agree. At present there is no generally accepted in vitro method for determining RS.

One of the problems in evaluating hydrothermal treatments as a means of producing RS is that analytical procedures for determination of RS often differ among laboratories. Because different analytical procedures may involve different thermal treatments in the analysis itself, the physical changes produced by hydrothermal treatments may not be equally detected among methods.

Many investigators assume that since boiling eliminates the enzyme resistance of some starch sources (potato, banana, wheat), a boiling treatment will eliminate type II RS in general, and thus the method is commonly used to quantify type III RS exclusive of type II RS. However, it is clear that for high-amylose starch a portion of the native starch remains resistant after boiling. It is less clear whether this boiling-stable RS should be considered type II or type III RS, since it is possible that the boiling treatment in the TDF analysis may have eliminated the type II RS and generated some type III RS. Nevertheless, the present inventors believe that because the fraction of the initial type II enzyme resistance stable to boiling is apparently enhanced, both the initial and the enhanced granular resistance stable to boiling are due to thermal stability of the initial granular structures. Consequently, the inventors have termed the RS observed after the boiling of high-amylose starch to be "boiling-stable granular RS." The above studies show how the proportion of boiling-stable granular RS may be manipulated to generate granular RS with improved ability to survive a thermal treatment commonly encountered in food processing.

Annealing of ae-VII starch at 70° C. increased the content of the boiling-stable granular RS determined by the TDF method. Even more boiling-stable granular RS was obtained when certain annealing treatments followed PAH of ae-VII starch (Table III). The method proposed by Englyst et al (1992) does not determine boiling-stable granular RS because the enzyme hydrolysis conditions are carried out at 37° C. However, if the starch is boiled immediately before the pancreatin hydrolysis, the method of Englyst et al (1992) can determine boiling-stable RS. When native ae-VII starch is analyzed by the method of Englyst et al (1992), the result (~79% RS) includes not only boiling-stable RS (~22%) but also non-boiling-stable RS (~56.7%) (FIG. 6).

As determined by the Englyst method without boiling, total RS decreased as the annealing temperature increased. RS decreased even more when annealing treatments were applied after PAH (Table III). This behavior is in contrast to changes in boiling-stable RS as determined by the TDF method. However, when the total RS content of 70° C. ANN treatment after 6 h of PAH was determined by the method of Englyst et al (1992) after boiling (~22%, FIG. 6) better agreement with the boiling-stable RS determined by the TDF method (~33%, Table 5) was obtained. HMT also increased the boiling-stable granular RS content (to ~43%), even as total RS decreased (to ~66%).

The increases in the boiling-stable granular RS content were observed despite the gelatinization enthalpy remaining constant after annealing. This observation may appear to be at variance with the idea that enzyme resistance is due to the formation of crystalline material or to the formation of more double helices. This apparent paradox can be resolved if the material normally able to gelatinize at boiling temperatures became more thermally stable due to annealing or heat-moisture treatments. As noted above, most of the gelatinization enthalpy of native αe-VII starch occurs below the boiling temperature. FIG. 1 shows that annealing treatments shifted the gelatinization enthalpy to higher temperature ranges, and FIG. 3 shows that HMT shifted the gelatinization enthalpy to even higher temperature ranges. Thus, the amount of boiling-stable granular RS may be related to the increased enthalpy at temperatures above 100° C. in DSC endotherms. In this way these reordered structures may have equal or less total enthalpy than native starches, and yet a greater proportion of the enthalpy above 100° C., accounting for the increased boiling-stable granular RS.

The DSC. results suggest that some of the starch responsible for the enzyme resistance evaluated at 37° C. (Englyst et al 1992) may be related to the enthalpy component located at temperatures below boiling. ANN and HMT reduced the proportion of the overall enthalpy observed below 100° C., as well as the RS content by the Englyst method.

Both ANN and HMT may be considered to be processes by which more perfect structures result. (Some authors distinguish between annealing in the narrow sense favored by starch chemists and annealing in the broader sense to describe formation of more perfect crystalline structure. In this description, annealing is used in the sense favored by the starch chemists). FIGS. 1 and 3 show how the area of the thermograms tends to be located at higher temperatures for either treatment. ANN should not reduce the gelatinization enthalpy; however, there is no requirement that HMT retain the initial enthalpy (even though that was the case for the HMT without prior PAH).

PAH would decrease the MW of the polymers allowing greater freedom of motion. For this reason, it was anticipated there would be an enhanced ability to form more stable structures. By DSC, the additional effect of PAH on ANN was about the same as for HMT. By the Englyst method of RS analysis, the additional effect of PAH on ANN was also about the same as for HMT. However, by the AOAC. TDF method, the highest value for a combination of PAH and HMT (~63%) was about double that for the highest combination of PAH and ANN (~33%). This outcome might be surprising since the total enthalpy is similar for PAH/ANN and for PAH/HMT combinations. The best explanation for this is that certain PAH/HMT combinations caused greater proportions of structures stable to treatment at 100° C. in excess water. Thus, these combinations generated a higher proportion of boiling-stable granular RS from ae-VII starch.

For PAH samples, the same temperatures as for unhydrolyzed starches led to variable loss in gelatinization enthalpy. Thus, PAH makes granules more sensitive to heat at these conditions of excess water. For PAH samples, HMT at the same temperatures as for unhydrolyzed starches also led to variable loss of gelatinization enthalpy, and thus these granules loss more enthalpy as well. Nevertheless, an enhanced portion of the observed enthalpy occurred at temperatures higher than 100° C., particularly for HMT at 120 and 140° C.

Gidley (1995) has pointed out that type III RS isolated at room temperatures includes considerable crystalline and helical material along with non-crystalline material protected in an amorphous network linking the crystalline regions. It is not known whether the resistance of type II RS is due to the same structural theme, but it may be based on a similar principle. Perhaps ANN or HMT serves to perfect portions of the crystalline regions. PAH would preferentially attack the amorphous portions of the granule, providing freedom and potential for chain ends to form double helices and for double helices to associate. The hydrothermal treatments would further contribute to the mobility of the chains and double helices. HMT appears to be the best suited for increasing the boiling-stable granular RS from ae-VII starch.

TABLE I

Thermal analysis of partially acid hydrolyzed and annealed ae-VII starch: Heating and immediate reheating[1]

Starch Sample

| Hydrolysis Time (h) | ANN[5] Temperature (° C.) | Heating[2,3,4] To (° C.) | Heating[2,3,4] ΔH (J/g) | Reheating[2,3,4] ΔH (J/g) |
|---|---|---|---|---|
| 0 | NT[6] | 63.0 ± 0.34$^a$ | 17.8 ± 0.44$^f$ | 8.4 ± 0.62$^e$ |
| 0 | 50 | 67.4 ± 0.15$^b$ | 20.0 ± 0.19$^g$ | 10.0 ± 0.08$^e$ |
| 0 | 60 | 73.2 ± 0.12$^c$ | 19.1 ± 0.12$^f$ | 8.9 ± 0.16$^e$ |
| 0 | 70 | 83.7 ± 0.08$^d$ | 18.2 ± 0.15$^f$ | 9.7 ± 0.21$^e$ |
| 6 | NT[6] | 61.4 ± 0.39$^a$ | 18.5 ± 0.25$^f$ | 5.0 ± 0.31$^d$ |
| 6 | 50 | 67.3 ± 0.23$^b$ | 20.3 ± 0.30$^g$ | 5.1 ± 0.14$^{d,c}$ |
| 6 | 60 | 74.2 ± 0.31$^c$ | 18.4 ± 0.16$^f$ | 6.4 ± 0.11$^d$ |
| 6 | 70 | 84.5 ± 0.42$^d$ | 14.5 ± 0.31$^c$ | 5.8 ± 0.23$^d$ |
| 30 | NT[6] | 61.3 ± 0.32$^a$ | 18.7 ± 0.14$^f$ | 3.7 ± 0.18$^b$ |
| 30 | 50 | 67.0 ± 0.18$^b$ | 17.0 ± 0.21$^e$ | 4.2 ± 0.13$^b$ |
| 30 | 60 | 74.2 ± 0.11$^c$ | 17.3 ± 0.24$^e$ | 5.1 ± 0.13$^c$ |
| 30 | 70 | 85.7 ± 0.24$^d$ | 12.5 ± 0.18$^b$ | 5.3 ± 0.13$^c$ |
| 78 | NT[6] | 61.7 ± 0.32$^e$ | 19.6 ± 0.20$^f$ | 3.1 ± 0.57$^a$ |
| 78 | 50 | 67.4 ± 0.40$^b$ | 15.2 ± 0.08$^d$ | 3.2 ± 0.13$^a$ |
| 78 | 60 | 74.0 ± 0.14$^c$ | 16.1 ± 0.25$^d$ | 4.1 ± 0.16$^b$ |
| 78 | 70 | 85.4 ± 0.29$^d$ | 11.0 ± 0.07$^a$ | 3.5 ± 0.21$^a$ |

[1]Initial heating and immediate reheating were performed from 20° C. to 180° C. at 10° C./min.
[2]Mean ± standard deviation of 2–3 replicates.
[3]Within each column, values with the same letter are not significantly different at α = 0.05 by Tukey's test performed in two-factor ANOVA (full model).
[4]To and ΔH correspond to onset temperature and enthalpy, respectively.
[5]ANN signifies annealing done, at 30% solids for 24 h, at the temperatures indicated.
[6]NT signifies non-treated by annealing.

TABLE II

Thermal analysis of partially acid hydrolyzed and heat-moisture treated ae-VII starch: Heating and immediate reheating[1]

Starch Sample

| Hydrolysis Time (h) | HMT[5] Temperature (° C.) | Heating[2,3,4] To (° C.) | Heating[2,3,4] ΔH (J/g) | Reheating[2,3,4] ΔH (J/g) |
|---|---|---|---|---|
| 0 | NT[6] | 63.0 ± 0.34$^a$ | 17.8 ± 0.44$^d$ | 8.4 + 0.62$^d$ |
| 0 | 100 | 76.2 ± 0.45$^d$ | 16.4 ± 0.41$^c$ | 7.3 ± 0.47$^{d,c}$ |
| 0 | 120 | 76.3 ± 0.61$^d$ | 17.0 ± 0.47$^d$ | 6.1 ± 0.39$^c$ |
| 0 | 140 | 79.0 ± 0.47$^e$ | 17.5 ± 0.52$^d$ | 6.4 ± 0.29$^c$ |
| 6 | NT[6] | 61.4 ± 0.39$^a$ | 18.5 ± 0.25$^d$ | 5.0 ± 0.31$^b$ |
| 6 | 100 | 75.0 ± 0.53$^d$ | 16.2 ± 0.39$^c$ | 4.8 ± 0.45$^b$ |
| 6 | 120 | 79.7 ± 0.45$^e$ | 14.9 ± 0.37$^b$ | 3.5 ± 0.47$^a$ |
| 6 | 140 | 88.2 ± 0.37$^f$ | 12.3 ± 0.51$^a$ | 3.0 ± 0.50$^a$ |
| 30 | NT[6] | 61.3 ± 0.32$^a$ | 18.7 ± 0.14$^d$ | 3.7 ± 0.18$^a$ |
| 30 | 100 | 72.8 ± 0.62$^c$ | 16.3 ± 0.55$^c$ | 3.6 ± 0.34$^a$ |
| 30 | 120 | 77.3 ± 0.55$^e$ | 15.4 ± 0.49$^b$ | 3.0 ± 0.41$^a$ |
| 30 | 140 | 94.0 ± 0.47$^g$ | 11.3 ± 0.37$^a$ | 3.1 ± 0.37$^a$ |
| 78 | NT[6] | 61.7 ± 0.32$^a$ | 19.6 ± 0.20$^d$ | 3.1 ± 0.57$^a$ |
| 78 | 100 | 67.2 ± 0.43$^b$ | 16.6 ± 0.51$^c$ | 2.9 ± 0.29$^a$ |
| 78 | 120 | 79.9 ± 0.61$^e$ | 15.3 ± 0.47$^b$ | 3.2 ± 0.35$^a$ |
| 78 | 140 | 95.2 ± 0.59$^g$ | 10.9 ± 0.35$^a$ | 2.8 ± 0.28$^a$ |

[1]Initial heating and immediate reheating were performed from 20° C. to 180° C. at 10° C./min.
[2]Mean ± standard deviation of 2–3 replicates.
[3]Within each column, values with the same letter are not significantly different at α = 0.05 by Tukey's test performed in two-factor ANOVA (full model).
[4]To and ΔH correspond to onset temperature and enthalpy, respectively.
[5]HMT signifies heat-moisture treatments done, at 70% solids for 80 min, at the temperatures indicated.
[6]NT signifies non-treated by annealing.

TABLE III

RS content determined by two methods for ae-VII starch annealed after partial acid hydrolysis.

| Hydrolysis time (h) | ANN[1] temperature (° C.) | RS %[2,3,4] Method 1[5] | RS %[2,3,4] Method 2[6] |
|---|---|---|---|
| 0 | NT[7] | 18.40 ± 0.39$^a$ | 78.66 ± 0.67$^e$ |
| 0 | 50 | 17.20 ± 0.95$^a$ | 74.62 ± 0.55$^d$ |
| 0 | 60 | 17.46 ± 0.48$^a$ | 65.78 ± 1.23$^c$ |
| 0 | 70 | 28.07 ± 0.64$^c$ | 52.63 ± 2.99$^b$ |
| 6 | NT[7] | 17.19 ± 1.32$^a$ | 74.22 ± 1.77$^e$ |
| 6 | 50 | 18.45 ± 0.46$^a$ | 74.00 ± 0.99$^{d,e}$ |
| 6 | 60 | 22.28 ± 1.52$^b$ | 64.77 ± 1.88$^c$ |
| 6 | 70 | 32.63 ± 0.56$^d$ | 46.56 ± 2.11$^a$ |
| 30 | NT[7] | 17.50 ± 1.53$^a$ | 77.76 ± 0.68$^e$ |
| 30 | 50 | 20.96 ± 1.10$^b$ | 72.53 ± 0.78$^d$ |
| 30 | 60 | 22.70 ± 1.07$^b$ | 65.02 ± 1.64$^c$ |
| 30 | 70 | 30.55 ± 1.16$^d$ | 47.00 ± 2.56$^a$ |
| 78 | NT[7] | 16.47 ± 0.70$^a$ | 79.14 ± 0.18$^e$ |
| 78 | 50 | 17.58 ± 1.01$^a$ | 72.55 ± 1.10$^d$ |
| 78 | 60 | 23.17 ± 0.86$^b$ | 63.93 ± 0.89$^c$ |
| 78 | 70 | 27.27 ± 1.68$^c$ | 42.75 ± 1.79$^a$ |

[1]ANN signifies annealing done, at 30% solids for 24 h, at the temperatures indicated.
[2]Percent resistant starch expressed as % of dry matter.
[3]Mean ± standard deviation of resistant starch determinations for 4–5 replicates.
[4]Values with the same letter are not significantly different at α = 0.05 by Tukey's test conducted in two-factor AMOVA (full model).
[5]RS detected as TDF according to AOAC (1985).
[6]RS detected according to Englyst (1992).
[7]NT signifies non-treated by annealing.

TABLE IV

RS content determined by two methods for ae-VII starch heat moisture-treated after partial acid hydrolysis.

| Hydrolysis time (h) | HMT[1] temperature (° C.) | RS %[2,3,4] Method 1[5] | RS %[2,3,4] Method 2[6] |
|---|---|---|---|
| 0 | NT[7] | 18.40 ± 0.39$^a$ | 78.66 ± 0.67$^g$ |
| 0 | 100 | 30.96 ± 0.64$^b$ | 66.78 ± 0.06$^e$ |
| 0 | 120 | 43.89 ± 0.28$^c$ | 55.86 ± 1.35$^c$ |
| 0 | 140 | 52.70 ± 0.60$^d$ | 55.28 ± 1.93$^c$ |
| 6 | NT[7] | 17.19 ± 1.32$^a$ | 74.22 ± 1.77$^g$ |
| 6 | 100 | 37.84 ± 0.41$^c$ | 70.26 ± 1.00$^e$ |
| 6 | 120 | 57.71 ± 0.71$^f$ | 59.21 ± 2.06$^d$ |
| 6 | 140 | 48.78 ± 0.54$^d$ | 44.14 ± 1.57$^a$ |
| 30 | NT[7] | 17.50 ± 1.56$^a$ | 77.76 ± 0.68$^g$ |
| 30 | 100 | 41.15 ± 1.10$^c$ | 73.73 ± 1.72$^f$ |
| 30 | 120 | 60.71 ± 1.23$^f$ | 65.96 ± 1.38$^e$ |
| 30 | 140 | 59.57 ± 2.22$^f$ | 48.65 ± 1.12$^b$ |
| 78 | NT[7] | 16.47 ± 0.70$^a$ | 79.14 ± 0.18$^g$ |
| 78 | 100 | 57.28 ± 1.17$^f$ | 78.06 ± 0.76$^g$ |
| 78 | 120 | 63.24 ± 1.42$^g$ | 60.62 ± 0.55$^d$ |
| 78 | 140 | 55.24 ± 2.18$^e$ | 48.21 ± 1.06$^b$ |

[1]HMT signifies heat-moisture treatment, at 70% solids for 80 min at the temperatures indicated.
[2]Percent resistant starch expressed as % of dry matter.
[3]Mean ± standard deviation of resistant starch determinations for 4–5 replicates.
[4]Values with the same letter are not significantly different at α = 0.05 by Tukey's test conducted in two-factor ANOVA (full model).
[5]RS detected as TDF according to AOAC (1985).
[6]RS detected according to Englyst (1992).
[7]NT signifies non-treated by heat-moisture treatment.

All articles cited herein and in the following list are hereby expressly incorporated in their entirety by reference.

CITATIONS

Chiu, C. W., Henley, M. Altieri, P. 1994. Process for making amylase resistant starch from high-amylose starch. U.S. Pat. No. 5,281,276.

Englyst, H. N., Kingman, S. M., Hudson, G. J., and Cummings, J. H. 1992. Classification and measurement of nutritionally important starch fractions. Eur. J. Clin. Nutr. 46:S33–S50.

Haralampu, S. G. and Gross, A. 1998. Granular resistant starch and method of making. U.S. Pat. No. 5,849,090.

Jacobs, H. and Delcour J. A. 1998. Hydrothermal modifications of granular starch, with retention of the granular structure: A Review. J. of Agric. Food Chem. 46(8): 2895–2905.

Jane J. L. and Robyt, J. F. 1984. Structure studies of amylose-v complexes and retrograded amylose by action of a-amylases and a new method for preparing amylodextrins. Carbohydrate Research 132:105–118.

Prosky, L., Asp, N. G., Furda, I., DeVries, J. W., Schweizer, T. F., and Harland, B. F. 1985. Determination of total dietary fiber in foods and food products: collaborative study. J. Assoc. Off. Anal. Chem. 68(4):677–679.

Shi, Y. C. and Trzasko P. T. 1997. Process for producing amylase resistant granular starch. U.S. Pat. No. 5,593,503.

Sievert, D. and Pomeranz. Y. 1989. Enzyme-resistant starch. I. Characterization and evaluation by enzymatic, thermoanalytical, and microscopic methods. Cereal Chem. 66(4):342–347.

Sievert, D. and Pomeranz, Y. 1990. Enzyme-resistant starch. II. Differential scanning calorimetry studies on heat-treated starches and enzyme-resistant residues. Cereal Chem. 67(3):217–221.

What is claimed is:

1. A method of making a boiling-stable granular resistant starch having a favorable yield of at least 60%, said method comprising:

partially depolymerizing a granular starch source to form a partially hydrolyzed starch, and heating the partially hydrolyzed starch, wherein the favorable yield is achieved employing a sequence of an acid hydrolysis followed by a hydrothermal treatment.

2. A method according to claim 1 wherein the granular starch source is partially depolymerized by incubating the starch source with an acid.

3. A method according to claim 2 wherein the acid is a mineral or an organic acid.

4. A method according to claim 3 wherein the acid is hydrochloric acid.

5. A method according to claim 2 wherein the starch source is incubated with the acid for about 1–100 hours.

6. A method according to claim 1 wherein the granular starch source is selected from the group consisting of tapioca, cassava, arrow-root, sago, oat, and sorghum.

7. A method according to claim 1 wherein the granular starch source is high amylose corn starch.

8. A method according to claim 7 wherein the partially hydrolyzed starch is heated at a moisture level of about 30% wet basis at a temperature of about 120° C.

9. A method according to claim 8 wherein the partially hydrolyzed starch is heated for about 60–100 minutes.

10. A method according to claim 7 wherein the high amylose corn starch is chemically unmodified.

11. A method according to claim 1 wherein the starch source is combined with water to form an aqueous starch suspension prior to the depolymerization step.

12. A method according to claim 1 further including the step of drying the partially hydrolyzed starch following the heating step.

13. A method according to claim 12 wherein the partially hydrolyzed starch is spray-dried.

14. A method of making a boiling-stable granular resistant starch having a favorable yield of at least 60%, said method comprising:

combining an unmodified granular starch source with an aqueous medium;

partially depolymerizing starch source with an acid to form a partially hydrolyzed starch; and heating the partially hydrolyzed starch, wherein the favorable yield is achieved employing a sequence of acid hydrolysis followed by hydrothermal treatment.

15. A method of making a boiling-stable granular resistant starch having a favorable yield of at least 60% said method, comprising:

combining a granular starch source with an aqueous medium;

partially depolymerizing the granular starch source with an acid to form a partially hydrolyzed starch; and heating the partially hydrolyzed starch.

* * * * *

UNITED STATES PATENT AND TRADEMARK OFFICE
CERTIFICATE OF CORRECTION

PATENT NO.    : 6,468,355 B1
DATED         : October 22, 2002
INVENTOR(S)   : Thompson et al.

Page 1 of 1

It is certified that error appears in the above-identified patent and that said Letters Patent is hereby corrected as shown below:

<u>Column 1,</u>
Line 5, add paragraph:
-- This invention was made with support from the Government under USDA Hatch Act No. PEN02789. The Government has certain rights in the invention. --.

Signed and Sealed this

Fifteenth Day of November, 2005

JON W. DUDAS
*Director of the United States Patent and Trademark Office*